US010124759B2

(12) United States Patent
Smith et al.

(10) Patent No.: US 10,124,759 B2
(45) Date of Patent: Nov. 13, 2018

(54) ASPIRATING AIRBAG ASSEMBLIES

(71) Applicant: Autoliv ASP, Inc., Ogden, UT (US)

(72) Inventors: Bradley W. Smith, Plain City, UT (US); Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/271,149

(22) Filed: Sep. 20, 2016

(65) Prior Publication Data

US 2018/0079384 A1 Mar. 22, 2018

(51) Int. Cl.
*B60R 21/34* (2011.01)
*B60R 21/36* (2011.01)
*C06D 5/02* (2006.01)

(52) U.S. Cl.
CPC ............ *B60R 21/36* (2013.01); *C06D 5/02* (2013.01); *B60R 2021/346* (2013.01)

(58) Field of Classification Search
CPC ..................................................... B60R 21/30
USPC ................................................. 280/738, 739
See application file for complete search history.

(56) References Cited

U.S. PATENT DOCUMENTS

| | | | |
|---|---|---|---|
| 3,909,037 A * | 9/1975 | Stewart | B60R 21/30 239/418 |
| 4,928,991 A * | 5/1990 | Thorn | B60R 21/30 280/738 |
| 5,437,473 A | 8/1995 | Henseler | |
| 5,496,062 A | 3/1996 | Rink et al. | |
| 5,588,675 A * | 12/1996 | Lotspih | B60R 21/201 280/732 |
| 5,605,347 A * | 2/1997 | Karlow | B60R 21/201 248/99 |
| 6,155,600 A | 12/2000 | Reynolds et al. | |
| 6,227,566 B1 * | 5/2001 | Kusaka | B60R 21/30 280/728.2 |

(Continued)

FOREIGN PATENT DOCUMENTS

| | | |
|---|---|---|
| EP | 46275 | 2/1982 |
| WO | WO9640556 | 12/1996 |

OTHER PUBLICATIONS

PCT/2017/048436, International Search Report, dated Nov. 8, 2017 (2 pgs.).
PCT/2017/048436, Written Opinion, dated Nov. 8, 2017 (6 pgs.).

*Primary Examiner* — Toan C To
(74) *Attorney, Agent, or Firm* — Matthew D. Thayne; Thayne and Davis LLC

(57) ABSTRACT

Airbag cushion assemblies for aspirating ambient air to enhance inflation. Some embodiments may comprise an inflation module comprising an inflator and a plurality of high-velocity nozzles fluidly coupled with the inflator and configured to deliver inflation gas from the inflator into an airbag cushion. A housing coupled to the airbag cushion, may comprise an aspiration inlet configured to allow for receipt of ambient air into the airbag cushion during inflation of the airbag cushion. The plurality of high-velocity nozzles may be configured to, upon actuation of the inflator, draw ambient air into the airbag cushion along with the inflation gas from the inflator. In some embodiments, a valve assembly may be provided that is configured to open upon actuation of the inflator and to close following inflation of the airbag cushion to prevent air and inflation gas from exiting through the aspiration inlet.

29 Claims, 12 Drawing Sheets

(56) References Cited

U.S. PATENT DOCUMENTS

| | | | |
|---|---|---|---|
| 6,513,602 B1 | 2/2003 | Lewis et al. | |
| 6,799,777 B2* | 10/2004 | Hawthorn | B60R 21/276 280/738 |
| 7,367,585 B2* | 5/2008 | Yu | B60R 21/2171 280/738 |
| 7,510,212 B2* | 3/2009 | Green | B60R 21/2338 280/738 |
| 7,530,596 B2* | 5/2009 | Bito | B60R 21/2338 280/738 |
| 7,584,987 B2* | 9/2009 | Choi | B60R 21/217 280/728.2 |
| 7,695,009 B2 | 4/2010 | Johanson et al. | |
| 7,762,580 B2 | 7/2010 | Breed | |
| 7,938,443 B1* | 5/2011 | Smith | B60R 21/261 280/736 |
| 2007/0052222 A1* | 3/2007 | Higuchi | B60R 21/233 280/738 |
| 2013/0049337 A1 | 2/2013 | Bogenrieder et al. | |
| 2014/0361522 A1* | 12/2014 | Breed | B60R 21/30 280/738 |

\* cited by examiner

ASPIRATING AIRBAG ASSEMBLIES

SUMMARY

Various improvements in vehicle technologies, such as autonomous vehicles, may require changes in the way airbag assemblies operate. For example, in some autonomous vehicles, or other newer vehicles, larger airbags may be used. This may be needed, for example, due to a larger distance between the airbag module and the vehicle occupant. In some systems, it is even contemplated that a single cushion may be used to provide protection to multiple occupants.

However, deploying large airbag cushions, or multiple airbag cushions simultaneously, may introduce difficulties. For example, venting of the ambient air within a vehicle may be needed to mitigate the increase in pressure caused by the displacement of air inside the vehicle resulting from deployment. Airbag assemblies that aspirate ambient air into the airbag cushion during deployment may allow for alleviating some of these difficulties. However, existing aspirating airbag assemblies suffer from many drawbacks, such as being large, bulky, and/or complicated, often requiring many different components and valve mechanisms.

The present inventor has therefore determined that it would be desirable to provide systems and methods that overcome one or more of the foregoing limitations and/or other limitations of the prior art. In some embodiments, the inventive concepts disclosed herein may allow for replacement of complicated components of previous systems by, for example, molding some or all of the jets or gas directing components integrally into a plastic housing, sewing or otherwise coupling relatively simple valve features into the assembly to simply and economically control the direction of aspirating gas flow, and/or employ pre-crash deployment sensor(s) to increase the amount of time allowed for aspiration.

In a more particular example of an airbag cushion assembly according to some embodiments, the assembly may comprise an airbag cushion and an inflation module, comprising an inflator and a plurality of high-velocity nozzles fluidly coupled with the inflator. The plurality of high-velocity nozzles may be configured to deliver inflation gas from the inflator into the airbag cushion. The assembly may further comprise a housing coupled to the airbag cushion. The housing may comprise an aspiration inlet, such as an open end on one side of the housing, configured to allow for receipt of ambient air into the airbag cushion during inflation of the airbag cushion. The plurality of high-velocity nozzles may be configured to, upon actuation of the inflator, draw ambient air into the airbag cushion along with the inflation gas from the inflator. The assembly may further comprise a valve configured to open upon actuation of the inflator. The valve may be configured to close during inflation of the airbag cushion to prevent air and inflation gas from exiting through the aspiration inlet.

In some embodiments, the valve may be configured to automatically close at a predetermined stage during inflation of the airbag cushion, such as upon receipt of a sufficient amount of gas into the airbag cushion.

In some embodiments, the valve may be biased towards a closed position, such as by providing, for example, a hinge or hinged component.

In some embodiments, the inflation module may comprise one or more inflator conduits. The inflator conduit(s) may be fluidly coupled with the inflator and fluidly coupled with the plurality of high-velocity nozzles. In some such embodiments, the inflator conduit(s) may comprise a cross-sectional dimension that decreases in size as the inflator conduit extends away from the inflator, and/or from a portion of the inflator through which inflation gas is delivered.

In another example of an airbag cushion assembly according to other embodiments, the assembly may comprise an airbag cushion and an inflation module comprising: an inflator and a housing coupled to the airbag cushion. The housing may comprise an aspiration inlet configured to allow for receipt of ambient air into the airbag cushion during inflation of the airbag cushion. The inflator conduit may be coupled with the housing and fluidly coupled with the inflator. A plurality of high-velocity nozzles may be fluidly coupled with the inflator conduit, wherein each of the plurality of high-velocity nozzles is configured to deliver inflation gas from the inflator into the airbag cushion, and wherein each of the plurality of high-velocity nozzles is configured to, upon actuation of the inflator, draw ambient air into the airbag cushion along with the inflation gas from the inflator.

The assembly may further comprise a valve, such as a one-way valve, comprising a flap and a support member coupled to the flap. The support member may be biased towards a closed position in which the flap blocks the aspiration inlet, and may be configured to open upon actuation of the inflator. The valve may further be configured to close during inflation of the airbag cushion, such as following completion of such inflation, to prevent air and inflation gas from exiting through the aspiration inlet following inflation of the airbag cushion.

In some embodiments, each of the plurality of high-velocity nozzles may extend through a corresponding plurality of openings formed in the flap.

In some embodiments, the valve may further comprise a hinge configured to bias the support member towards the closed position.

In some embodiments, the flap may be formed from a portion of the airbag cushion, such as an integral portion or extension of the airbag cushion.

In still another example of an airbag cushion assembly according to other embodiments, the assembly may comprise an airbag cushion and an inflation module comprising a compressed gas chamber fluidly coupled with the airbag cushion. The compressed gas chamber may be filled with a gas mixture comprising a flammable gas and an inert gas. A housing may be coupled to the airbag cushion, wherein the housing comprises an aspiration inlet configured to allow for receipt of ambient air into the airbag cushion during inflation of the airbag cushion, and wherein, upon actuation, the compressed gas chamber is configured to force the gas mixture into the airbag cushion, and wherein the gas mixture is configured to draw ambient air into the airbag cushion while being forced into the airbag cushion. The assembly may further comprise an initiator extending into the airbag cushion and configured to ignite a flammable gas inside the airbag cushion upon actuation, the flammable gas made up of the gas mixture and ambient air.

In some embodiments, the inflation module may further comprise at least one nozzle, and in some such embodiments a plurality of high velocity nozzles, fluidly coupled with the compressed gas chamber. The nozzle(s) may be configured to deliver the gas mixture from the compressed gas chamber into the airbag cushion, preferably at a high velocity and or volume per unit time so as to entrain ambient air into the cushion as well.

In some embodiments, the airbag cushion may comprise a pedestrian airbag cushion configured to be deployed from an exterior surface of a vehicle during an impact so as to cushion a pedestrian during the impact.

In some embodiments, the compressed gas chamber lacks an oxidizing gas, and the airbag cushion assembly is configured such that oxygen obtained from the ambient air is used as an oxidizing gas during ignition of the flammable gas.

In some embodiments, the flammable gas comprises at least one of hydrogen and methane, and the inert gas comprises at least one of nitrogen and argon. In some such embodiments, the gas mixture may comprise hydrogen in an amount between about 30 mol % and about 40 mol %, and the gas mixture further comprises argon in an amount between about 60 mol % and about 70 mol %.

Some embodiments may further comprise a second initiator coupled with the compressed gas chamber. The second initiator may be configured to, upon actuation, force the gas mixture into the airbag cushion with sufficient force to draw ambient air into the airbag cushion with the gas mixture.

Some embodiments may further comprise a valve configured to open upon actuation of the inflator. The valve may further be configured to automatically close during inflation of the airbag cushion, such as following sufficient inflation of the airbag cushion with the gas mixture and ambient air. In some embodiments, the combustion caused by the initiator may be configured to result in closure of the valve.

In an example of an airbag inflation module according to some embodiments, the airbag inflation module may comprise a housing configured to be coupled with an airbag cushion, wherein the housing comprises an aspiration inlet configured to allow for receipt of ambient air into the airbag cushion during inflation of the airbag cushion. The airbag inflation module may further comprise an inflator configured to generate an inflation gas to facilitate inflation of the airbag cushion, and an inflator conduit coupled with the housing and fluidly coupled with the inflator. The inflation module may further comprise a valve assembly, which may comprise a first panel and a second panel. The valve assembly may be configured to be positioned in/between an open position in which ambient air is allowed to pass through the aspiration inlet and a closed position in which the first panel and the second panel block the aspiration inlet.

The inflation module may further comprise a plurality of high-velocity nozzles fluidly coupled with the inflator conduit, wherein each of the plurality of high-velocity nozzles is configured to deliver inflation gas from the inflator, and wherein each of the plurality of high-velocity nozzles is configured to, upon actuation of the inflator, draw ambient air though the aspiration inlet along with the inflation gas from the inflator.

In some embodiments, the first panel may be configured to at least partially overlap with the second panel in the closed position. In other embodiments, the first panel may be configured to extend adjacent to the second panel in the closed position without any overlap.

In some overlapping embodiments, the first panel may comprise a lower panel, and the second panel may comprise an upper panel, wherein the lower panel is configured to be positioned below the upper panel in the closed position, and wherein the valve assembly is configured such that, following actuation of the inflator, the valve assembly is configured to return to the closed position with the lower panel positioned below the upper panel. In some such embodiments, the lower panel may be biased towards a closed position in which the lower panel at least partially blocks the aspiration inlet, and the upper panel is biased towards a closed position in which the upper panel at least partially blocks the aspiration inlet, wherein the lower panel is biased towards the closed position with a greater force than a force with which the upper panel is biased towards the closed position. This may allow the lower panel to spring back to its closed position quicker than the upper panel following inflation of an airbag cushion, which may be positioned within the inflation module.

In some embodiments, the first panel may comprise a plurality of openings configured to receive at least a subset of the plurality of high-velocity nozzles therethrough. In some such embodiments, the second panel may also comprise a plurality of openings configured to receive at least a subset of the plurality of high velocity nozzles therethrough. In some such embodiments, at least some of the plurality of openings of the first panel may overlap with at least some of the plurality of openings of the second panel such that at least some of the plurality of high velocity nozzles are configured to extend through an opening of the first panel and an opening of the second panel in the closed position.

In some embodiments, the valve assembly may further comprise means for biasing a panel, such as one or both of the first panel and the second panel, towards the closed position. In some such embodiments, the means for biasing may comprise a first hinge configured to bias the first panel towards the closed position and a second hinge configured to bias the second panel towards the closed position.

In other embodiments, the means for biasing may comprise a coupling member configured to couple at least one of the first panel and the second panel to the housing at a first end of the at least one of the first panel and the second panel, the coupling member being configured to allow the at least one of the first panel and the second panel to pivot between the open position and the closed position. In some such embodiments, the coupling member may comprise a coupling band extending along a perimeter of the at least one of the first panel and the second panel at the first end, wherein the coupling band is configured to sandwich the perimeter of the at least one of the first panel and the second panel between the housing and the coupling band. In some embodiments, the coupling band may comprise a distinct material, such as a stiffer or more rigid material, than the vent panels. One or more fasteners, such as rivets or bolts, may be used to couple the vent panel(s) between the housing and the coupling member.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to aspirating airbag cushion assemblies configured to utilize ambient air, in some cases along with inflation gas, to inflate larger airbag cushions, such as airbag cushions for multiple occupants, airbag cushions for autonomous vehicles, or pedestrian airbag cushions.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
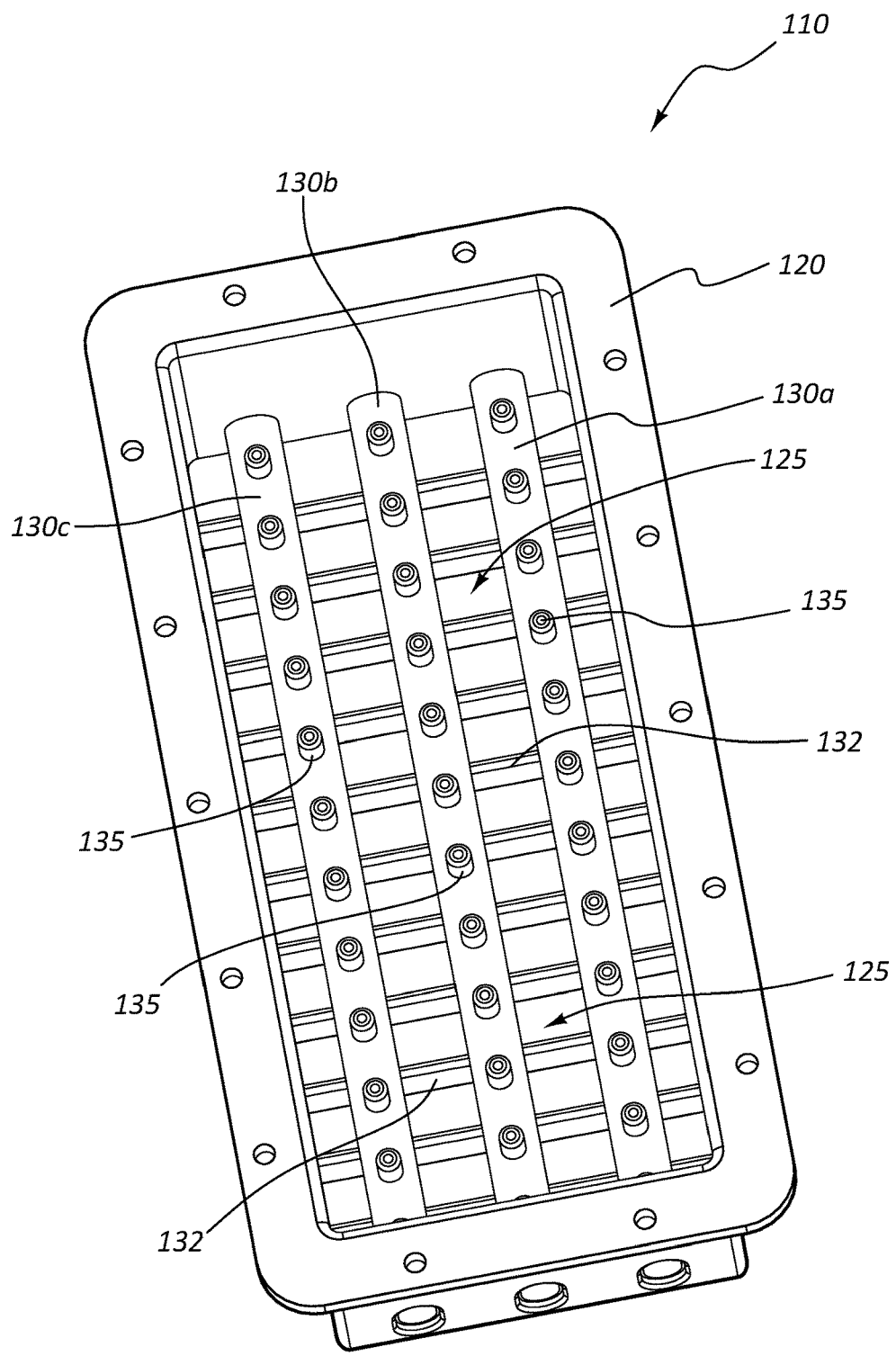
FIG. 1 is a perspective view of an airbag inflation module according to some embodiments.

FIG. 1 depicts an airbag inflation module 110 for use in connection with certain airbag cushion assemblies disclosed herein. Airbag inflation module 110 comprises a housing 120 configured to be coupled to an airbag cushion (not depicted in FIG. 1). Housing 120 comprises an aspiration inlet 125 at one end that is configured to allow for receipt of ambient air into the airbag cushion during inflation of the airbag cushion. In the depicted embodiment, aspiration inlet 125 is defined by a plurality of openings positioned in between inflator conduits 130a, 130b, and 130c, each of which comprises a plurality of high-velocity nozzles 135, along with a plurality of support members 132 extending perpendicular to the inflator conduits 130a, 130b, and 130c. As will be discussed in detail below, aspiration inlet 125 is configured to fluidly couple an internal portion of an airbag cushion with ambient air upon opening a suitable valve to allow for introduction of ambient air into the airbag cushion along with inflation gas from nozzles 135.

It is also preferred that a relatively large number of nozzles be used in order to create a sufficient pressure differential to drive the aspiration and to provide uniform distribution of the inflation gas driving aspiration. Although thirty-six nozzles are shown in the preferred embodiments depicted in the drawings, this precise number is not required. In addition, preferably each of the high-velocity nozzles 135 is configured to keep the inflation gas delivered therethrough in a relatively tight column while being delivered into the airbag cushion rather than expanding into a plume of gas. This may further facilitate creation of the desired pressure differential to drive the aspiration process. Thus, it is preferred that the pressure driving the nozzles 135 not exceed about 500 psi. It may also be preferred that this pressure be at least about 100 psi. Thus, in some preferred embodiments, the pressured within the inflator conduits 130 is between about 100 and about 500, or in some such embodiments between 100 and 500, psi.

Although a relatively high-velocity may be desirable, in some embodiments, it may be preferred to keep the velocity of the gas from nozzles 135 from reaching a certain upper limit. For example, in certain preferred embodiments, the airbag inflation module 110 may be configured such that the gas delivered from nozzles 135 is below supersonic velocities. This may be useful in preventing the plume created by the incoming gas from getting too large. Thus, it may be preferred to keep the gas from nozzles 135 as close to being delivered in a vertical column/stream as possible.

It may also be preferred that the nozzles be space apart from one another sufficiently such that the streamlines of the expanding gas do not intersect, or at least intersect minimally. Thus, preferably the nozzles are spaced apart with the maximum amount of space in between each adjacent nozzle within the area allotted to the aspiration inlet, such as the case in the depicted embodiment.

Figure 2:
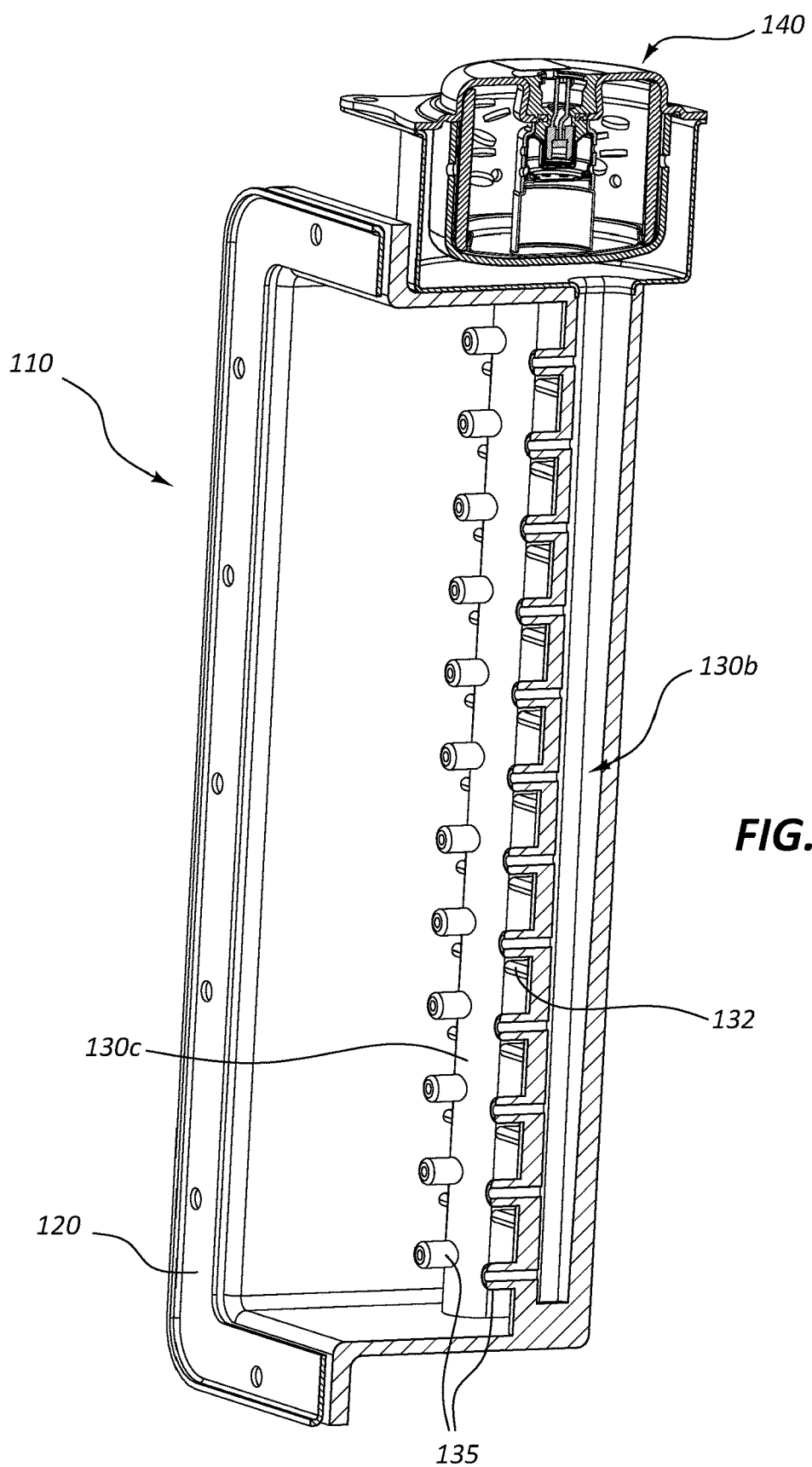
FIG. 2 is a cross-sectional view of the airbag assembly of FIG. 1.

Airbag inflation module 110 further comprises an inflator 140, as shown in FIG. 2. Inflator 140 is fluidly coupled with inflator conduits 130a, 130b, and 130c, which, in turn, are fluidly coupled with nozzles 135. Nozzles 135 are configured to deliver inflation gas from inflator 140 into an airbag cushion at a high rate of velocity and/or rate of volume/time such that ambient air is drawn into the airbag cushion with the inflation gas from nozzles 135 through aspiration inlet 125 such that the airbag cushion is inflated by both the inflation gas and the ambient air together.

In alternative embodiments, rather than providing a plurality of spaced nozzles, conduits 130 may be provided with a linear slit positioned along one or more of their respective upper ends.

FIG. 2 further illustrates that one or more (in some embodiments, all) of the inflator conduits 130 may have a cross-sectional dimension that decreases in size as the inflator conduit 130 extends away from the inflator 140. This may be useful for having a uniform, or at least more uniform, distribution of gas through each of the various nozzles 135 during inflation. Although the cross-sectional diameter of inflator conduit 130b depicted in FIG. 2 has a gradual taper from inflator 140 to the distal end of inflator conduit 130b, it should be understood that, in alternative embodiments, the cross-sectional diameter and/or other dimension may vary in other ways, such as via one or more steps or otherwise more abrupt changes in such cross-sectional diameter/dimension. In preferred embodiments, inflator conduits 130 and, in some embodiments, nozzles 135, housing 120, and/or the entire inflation module 110, may be made from a molded thermoplastic material.

Figure 3:
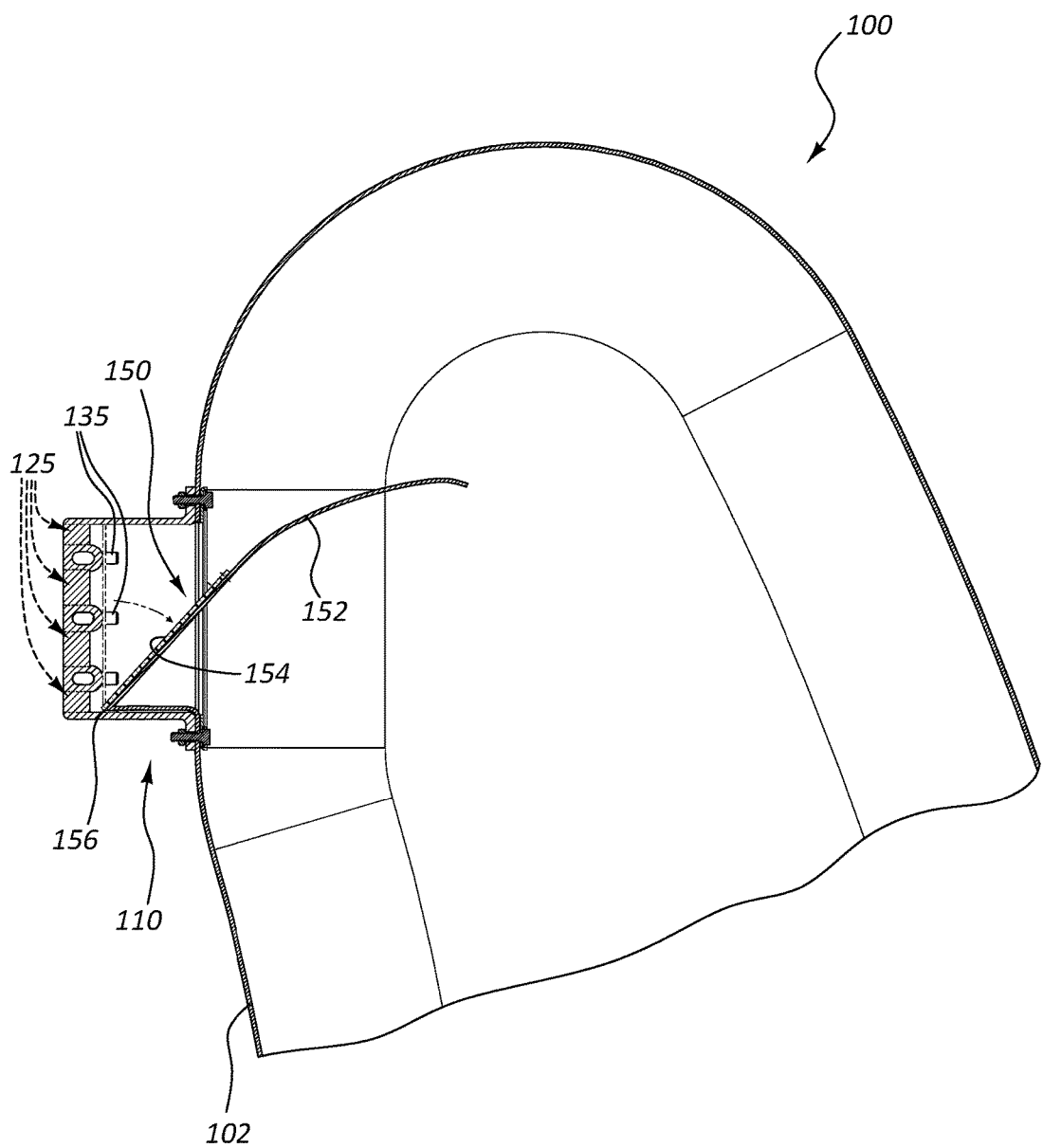
FIG. 3 is a cross-sectional view of an airbag cushion assembly incorporating the airbag inflation module of FIGS. 1 and 2 shown prior to insertion of the airbag cushion into the housing.

FIG. 3 is a cross-sectional view of a portion of an airbag cushion assembly 100 incorporating the inflation module 110 previously described. As shown in this figure, airbag cushion assembly 100 comprises an airbag cushion 102.

Airbag cushion assembly 100 further comprises a valve assembly 150. Valve assembly 150 comprises a flap 152, a support member 154, and a hinge 156. In some embodiments, flap 152 may comprise the same material used to define airbag cushion 102. In some such embodiments, flap 152 may simply comprise an integral extension of this material. Preferably, support member 154 is rigid, and therefore may comprise a panel made up of a rigid material such as, for example, a rigid thermoplastic material.

Hinge 156 is preferably configured to bias the valve 150 towards a closed position in which valve 150 covers, either partially or wholly, aspiration inlet 125. Upon actuation of inflator 140, valve 150 is preferably configured to open to allow for introduction of ambient air into airbag cushion 102 through aspiration. This may be accomplished by the forces from inflation gas through nozzles 135, by a change in pressure resulting from the inflation gas delivered through nozzles 135, and/or by airbag cushion 102 being deployed and expanded to create a partial vacuum therein. In other words, although, as discussed below, preferably valve 150 comprises openings configured to receive nozzles 135 therethrough, in some embodiments, a subset of such nozzles may be positioned such that inflation gas directly forces valve 150 into an open position. Alternatively, each of the nozzles 135 may extend through respective openings in valve 150 and inflation module 110 may be configured such that delivery of inflation gas through nozzles 135 results in a sufficient change in pressure to indirectly open valve 150 upon actuation of inflator 140. Thus, preferably valve 150 is a one-way, passive valve. In addition, as will be more apparent in connection with the discussion below, preferably valve 150 is configured to automatically close at a predetermined stage during inflation of airbag cushion 102. Although a passive valve may be preferred for certain embodiments, such as for cost reasons, other valves, such as electrical and/or mechanical valves, may be used in alternative embodiments.

Figure 4:
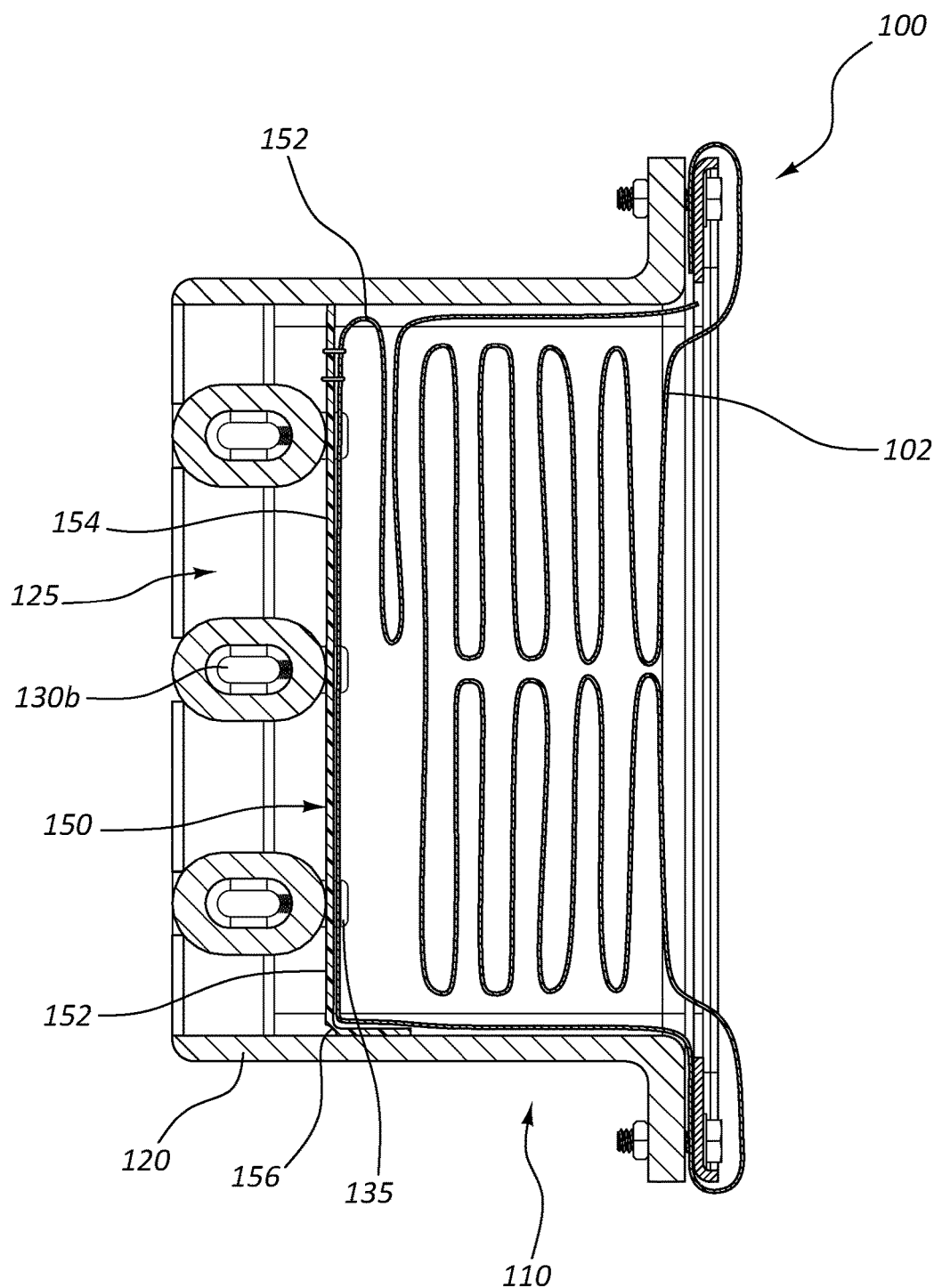
FIG. 4 is a cross-sectional view of the airbag cushion assembly of FIG. 3 after insertion of the airbag cushion into the housing.

FIG. 4 is a cross-sectional view of airbag cushion assembly 100 after valve assembly 150 has been placed into a closed position and airbag cushion 102 has been folded into housing 120. As best seen in this figure, panel 154 may be sewn or otherwise directly coupled with flap 152 such that flap 152 and panel 154 swing together about hinge 156 between the closed position depicted in FIG. 4 and an open position in which aspiration gas can be introduced into airbag cushion 102 along with inflation gas from inflator 140.

Figure 5:
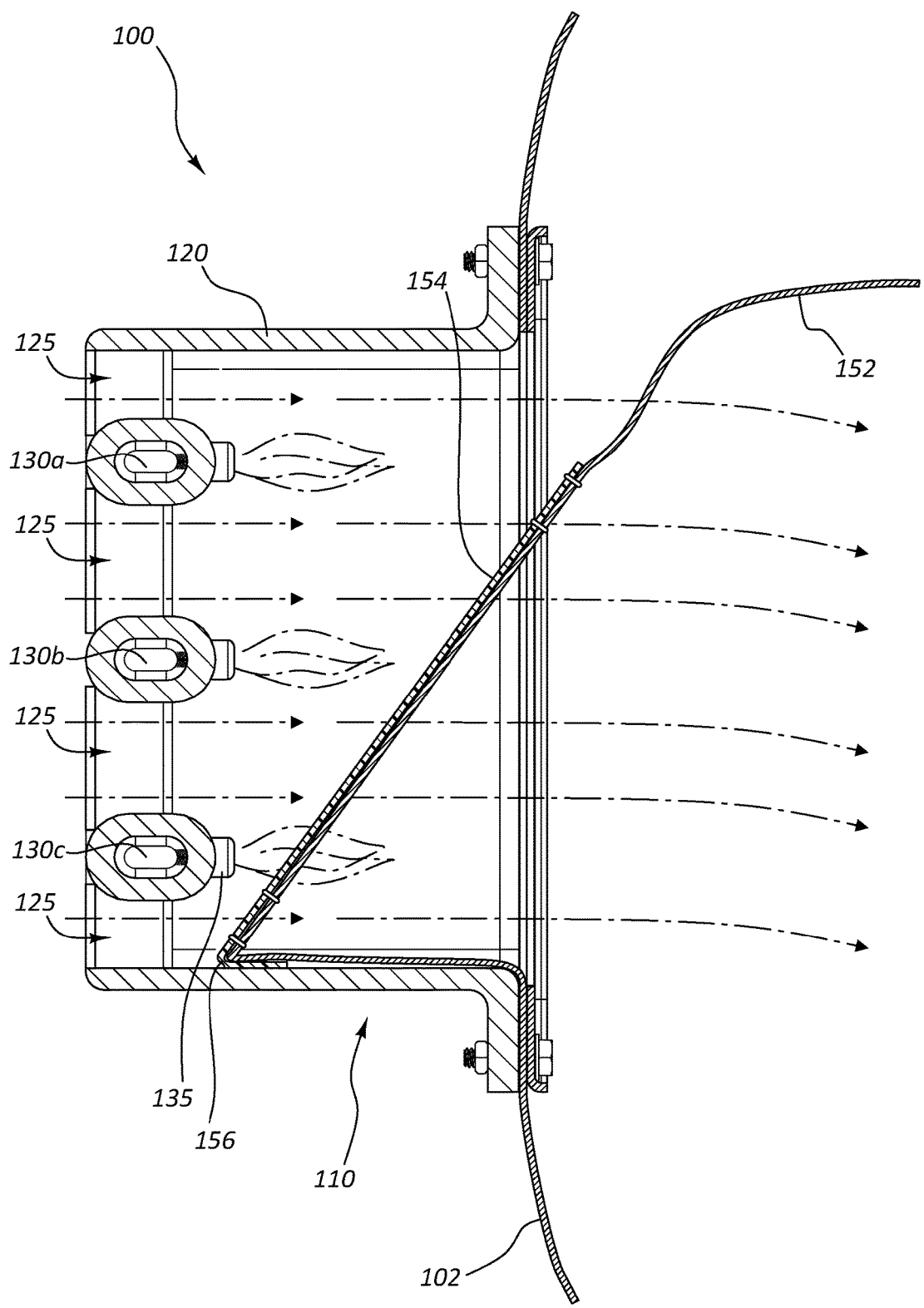
FIG. 5 is a cross-sectional view of the airbag cushion assembly of FIGS. 3 and 4 during deployment.

FIG. 5 illustrates airbag cushion assembly 100 during inflation. As shown in this figure, once inflator 140 has been deployed, inflation gases are introduced in a forceful manner into airbag cushion 102. The velocity and/or rate of volume of gas delivered through nozzles 135 are sufficient to cause ambient air to be entrained within the inflation gas and therefore aspirated into airbag cushion 102 along with this inflation gas, as indicated by the arrows in FIG. 5.

This aspiration of ambient air, in some embodiments along with the inflation gas delivered through one or more of the nozzles 135, also results in movement of valve assembly 150 from a closed position in which it blocks aspiration inlet 125 towards an open position in which valve assembly 150 allows ambient air to be delivery through aspiration inlet 125. FIG. 5 depicts valve assembly 150 in an intermediate position between these open and closed positions. Preferably, valve assembly 150 is also configured to automatically close to prevent ambient air and inflation gas from exiting through aspiration inlet 125 following inflation.

Figure 6:
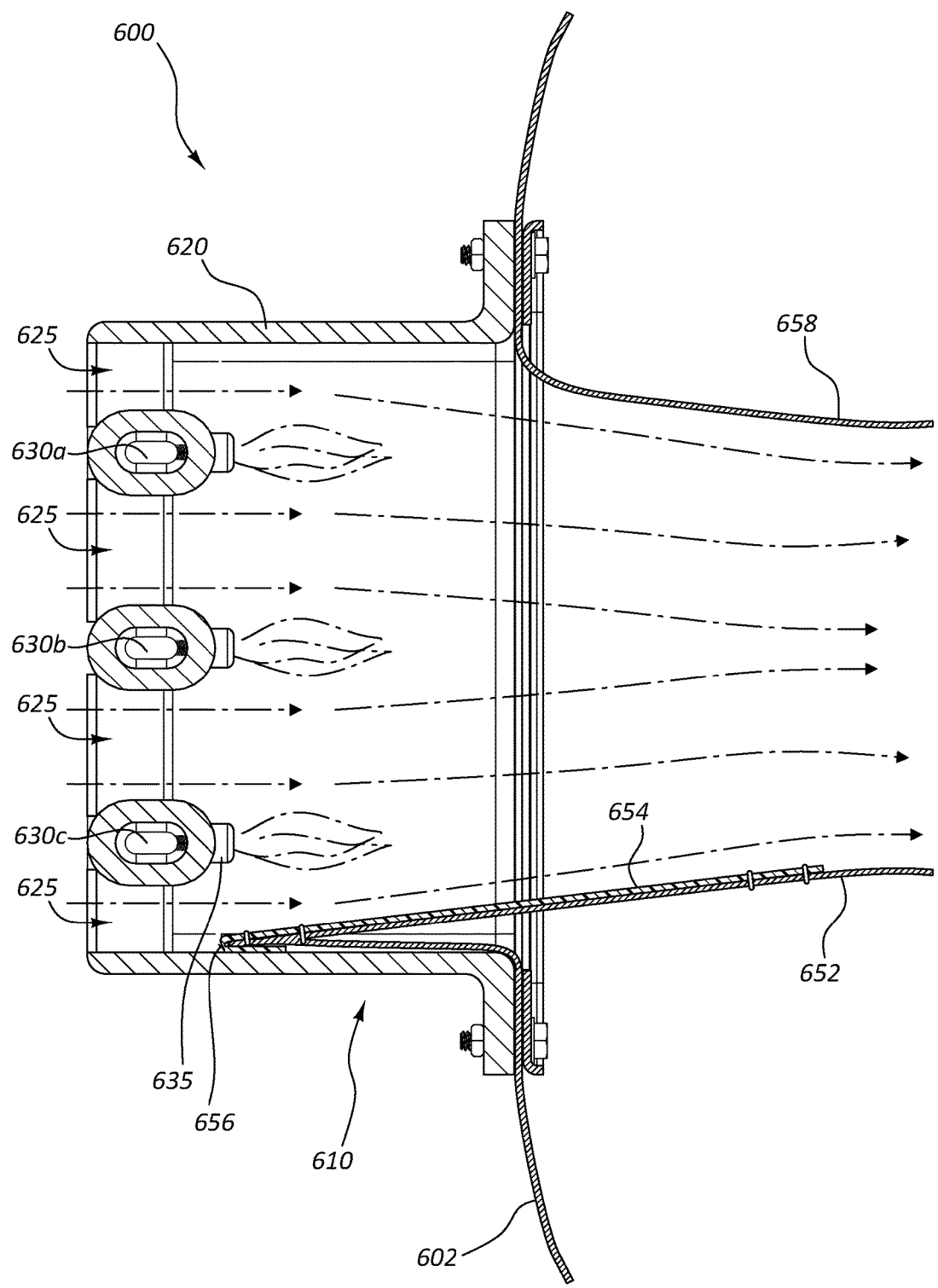
FIG. 6 is a cross-sectional view of an alternative embodiment of an airbag cushion assembly during deployment.

FIG. 6 illustrates an alternative embodiment of an airbag cushion assembly 600 during inflation. Airbag cushion assembly 600 is similar to airbag cushion assembly 100 with a few exceptions. Most notably, airbag cushion assembly 600 comprises a valve assembly 650 that comprises two flaps, namely, first flap 652 and second flap 658. Flaps 652 and 658 may both be formed as integral extensions of airbag cushion 602 on opposite sides of inflation module 610. Alternatively, flaps 652 and 658 may be opposing portions of a single flap formed from an extension of airbag cushion 602 so as to form a tubular structure. As still another alternative, one or both of flaps 652 and 658 may comprise parts of another portion of the cushion, such as a diffuser. Or one or both flaps 652 and 658 may simply be separate pieces coupled to the housing 610. Prior to deployment, flaps 652 and 658 may be folded on top of one another in a closed position.

Also, a hinged panel or other support member 654 may be sewn or otherwise coupled to one or both of flaps 652/658. Although a separate hinge 656 is depicted in FIG. 6, those of ordinary skill in the art will appreciate that support member 654 may simply be formed of a flexible material that serves as a hinge rather than providing a separate hinge, if desired. In addition, a second hinge may be provided, if desired, for flap 658.

Figure 7:
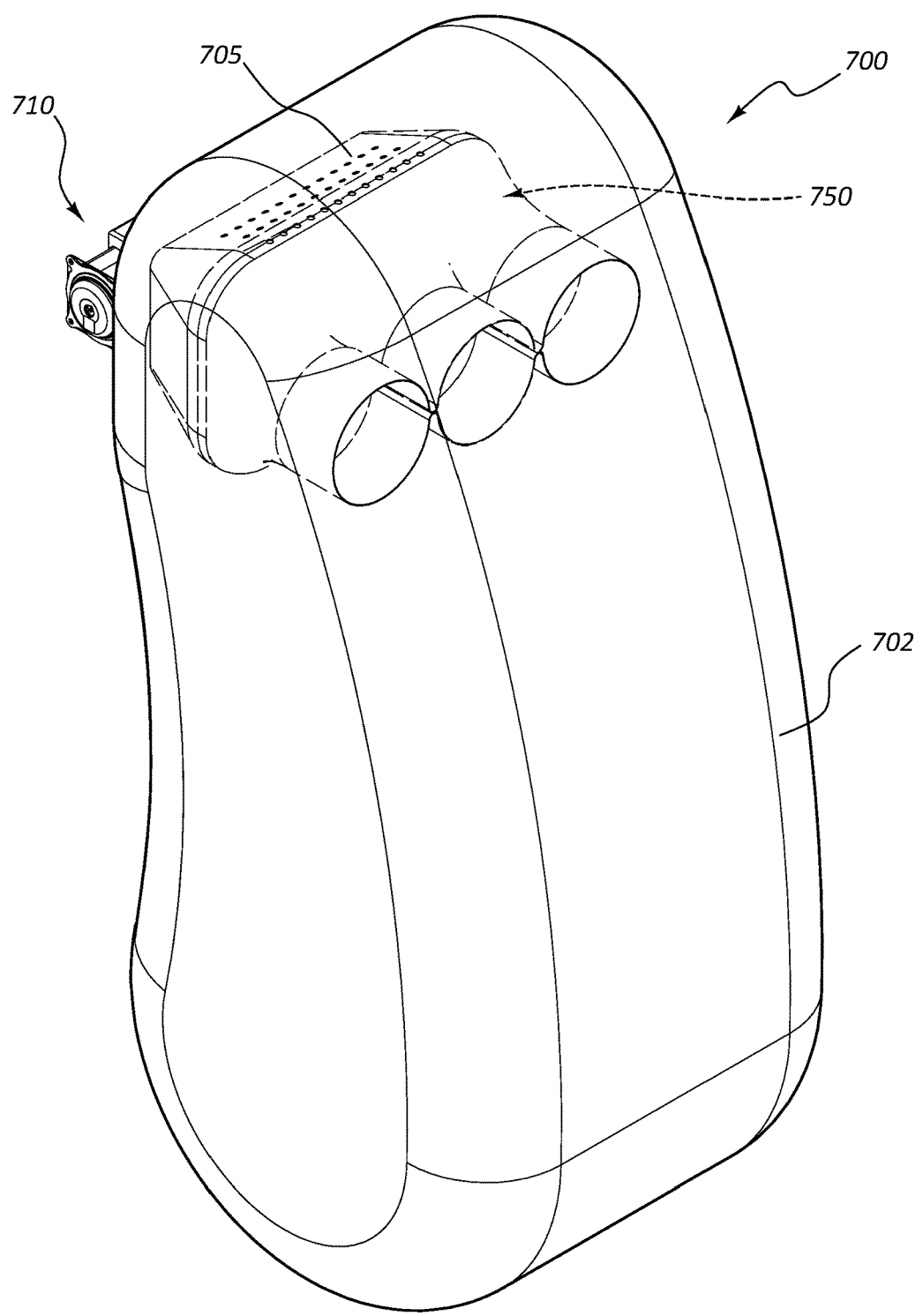
FIG. 7 is an upper, perspective, phantom view of an airbag cushion assembly according to other embodiments.
Figure 8:
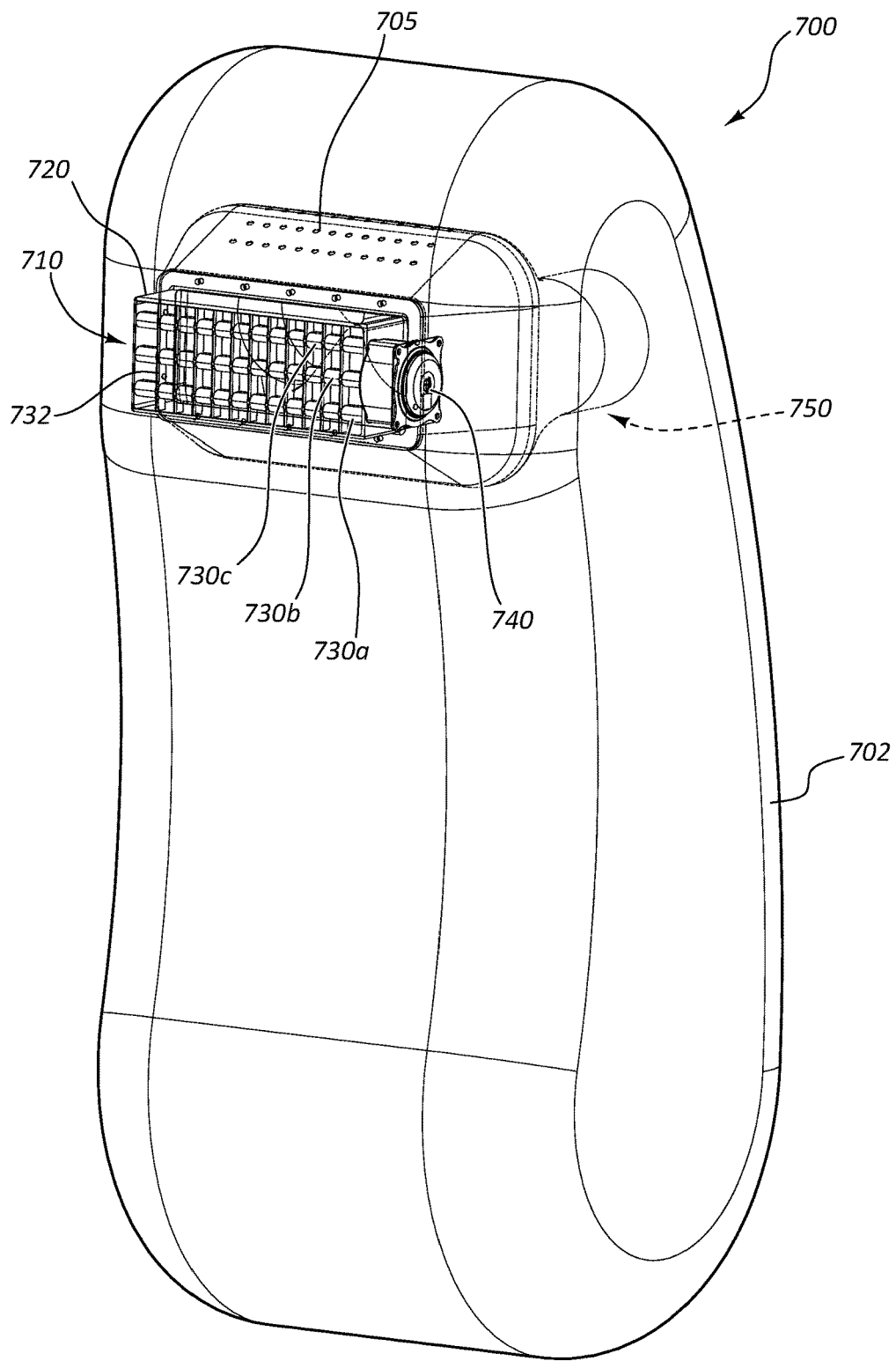
FIG. 8 is a lower, perspective, phantom view of another embodiment of an airbag cushion assembly of FIG. 7.

FIGS. 7 and 8 depict yet another embodiment of an airbag cushion assembly 700 having a different valve 750, which is shown in phantom in these figures. These figures also depict a preferred placement of inflation module 710 relative to airbag cushion 702 and more clearly depict the open bottom side of inflation module 710, which may be similar or identical to inflation module 110, which allows for ambient gas to be aspirated into airbag cushion 702. These figures also depict how inflator 740 is large enough to distribute inflation gas (preferably evenly) to all three inflation conduits 730a, 730b, and 730c simultaneously. Again, inflation conduits 730a, 730b, and 730c may be similar or identical to inflation conduits 130a, 130b, and 130c and may be coupled with their respective inflator 740/140 in the same manner. Also, as previously mentioned, if the cross-sectional diameter or another dimension of these inflation conduits is made smaller as the distance from inflator 740 increases, the velocity and other volume of gas per unit time through each of the inflation conduits 730 may similarly be at least substantially uniform.

As also depicted in FIGS. 7 and 8, valve 750 may comprise an integrally formed panel or flap 705 comprising a plurality of openings configured to receive the plurality of nozzles therethrough. Although FIGS. 7 and 8 depict airbag cushion assembly 700 in a deployed configuration, it should be understood that valve 750 may be folded down to block the open bottom side of inflation module 710 (aspiration inlet) prior to deployment. Upon deployment, inflation gas from inflator 740 and/or a partial vacuum created within airbag cushion 702 may cause valve 750 to unblock this opening/inlet to allow for aspiration of ambient air into airbag cushion 702. In some embodiments, one or more other flaps and/or portions of valve 750 may be placed over flap 705 such that inflation gas from inflator 740 forces these other flaps/portions to unfold first during deployment, as described in greater detail below. Also, as previously mentioned, valve 750 may be made from the same material and, in some embodiments, as an integral extension of the fabric of airbag cushion 702. Alternatively, valve 750 may be formed from other materials and/or coupled separately to inflation module 710.

Figure 9:
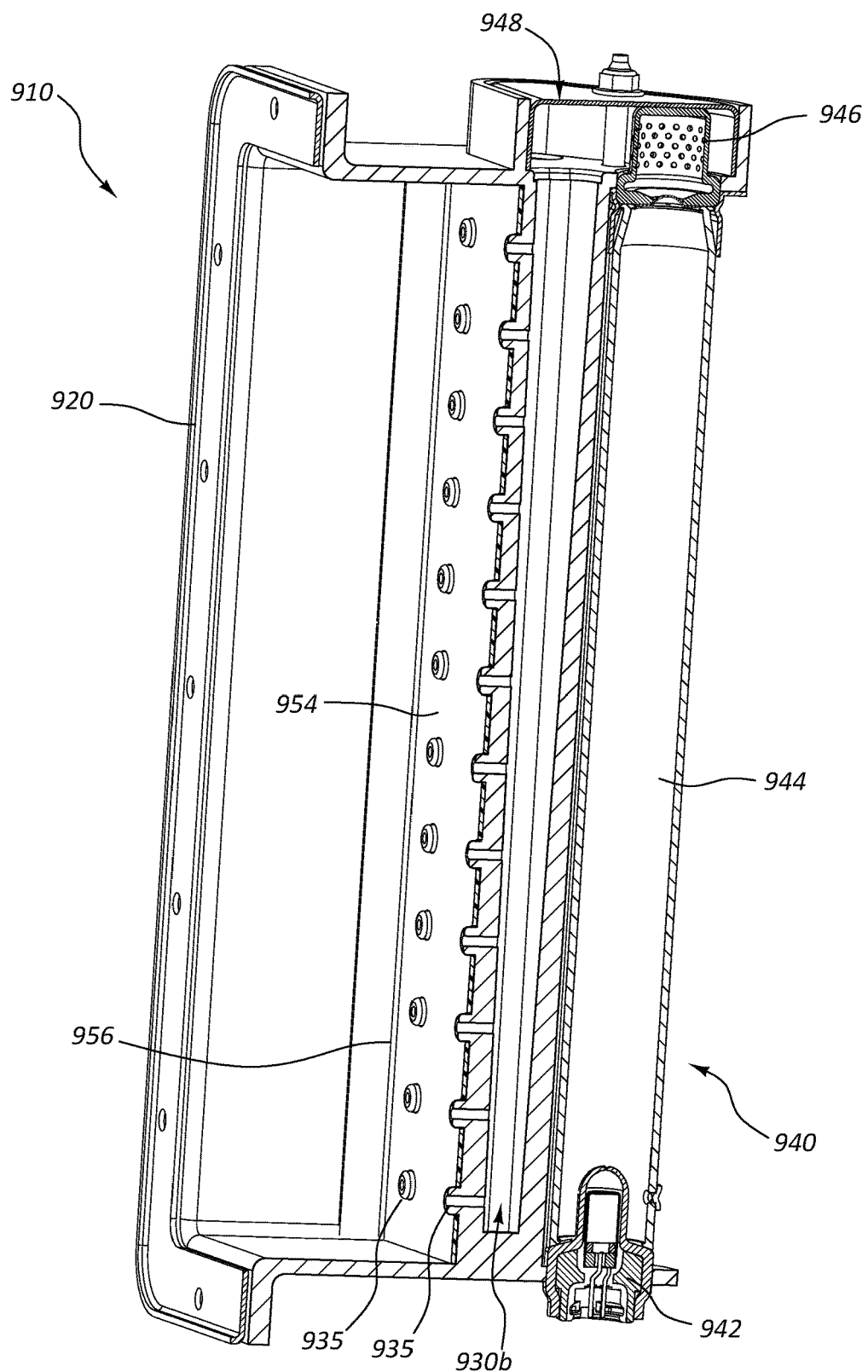
FIG. 9 is a cross-sectional view of an airbag inflation module according to another embodiment.

FIG. 9 illustrates an alternative embodiment of an inflation module 910. Like inflation module 110, inflation module 910 comprises a housing 920 configured to be coupled to an airbag cushion (not depicted in FIG. 9). Although not visible in FIG. 9 (see FIG. 10), housing 920 preferably also comprises an aspiration inlet 925 at one end that is configured to allow for receipt of ambient air by aspiration into the airbag cushion during inflation of the airbag cushion. In FIG. 9, this inlet is blocked by a panel 956 that is part of a valve assembly 950, as explained in greater detail below. As with inflation module 110, this aspiration inlet may be defined by a plurality of openings positioned in between inflator conduits 930a, 930b, and 930c, each of which comprises a plurality of high-velocity nozzles 935. A plurality of support members 932 may extend perpendicular to the inflator conduits 930a, 930b, and 930c.

Inflation module 910 differs from inflation module 110 in that it comprises an inflator 940 that comprises a chamber 944 of compressed inflation gas. Inflator may further comprise an initiator 942 and a diffuser 946 positioned on opposite ends of chamber 944. Inflation module 910 may further comprise a gas distribution chamber 948 positioned adjacent to diffuser 946 at the end of chamber 944 from which inflation gas is configured to be delivered. Gas distribution chamber 948 is fluidly coupled with each of the inflation conduits 930a, 930b, and 930c such that gas from chamber 944, upon deployment, can be delivered through each of the inflation conduits 930a, 930b, and 930c and, ultimately, through each of the various nozzles 935 fluidly coupled thereto. As shown in FIG. 9, in preferred embodiments, the cross-sectional diameters or another dimensions of inflation conduits 930a, 930b, and 930c decreases as the distance from gas distribution chamber 948 increases.

Chamber 944 preferably comprises a gas mixture comprising a flammable and/or volatile gas and an inert gas that may be ignited within an airbag cushion to allow for more rapid inflation of certain larger airbag cushions, such as cushions for multiple occupants or pedestrian cushions, for example. In some embodiments, chamber 944 lacks an oxidizing gas. In such embodiments, oxygen obtained from the ambient air during aspiration, as previously discussed, may be used as an oxidizing gas during ignition of the gas within the airbag cushion. In some embodiments, the flammable gas may comprise at least one of hydrogen and methane, and the inert gas may comprise at least one of nitrogen and argon. In some such embodiments, the gas mixture may comprise, for example, flammable gas or gases (such as hydrogen, for example) in an amount between about 30 mol % and about 40 mol %, and may comprise inert gas or gases (such as argon, for example) in an amount between about 60 mol % and about 70 mol %. However, it is contemplated that any gaseous hydrocarbon in the range of about minus 40 degrees Celsius to about 90 degrees Celsius at the typical storage pressures in a compressed gas inflator may be acceptable for certain embodiments. In addition, although it may be preferred to combine the flammable and inert gases into a single chamber, alternative embodiments are contemplated in which these gases may be in separate chambers and/or introduced separately.

Figure 10:
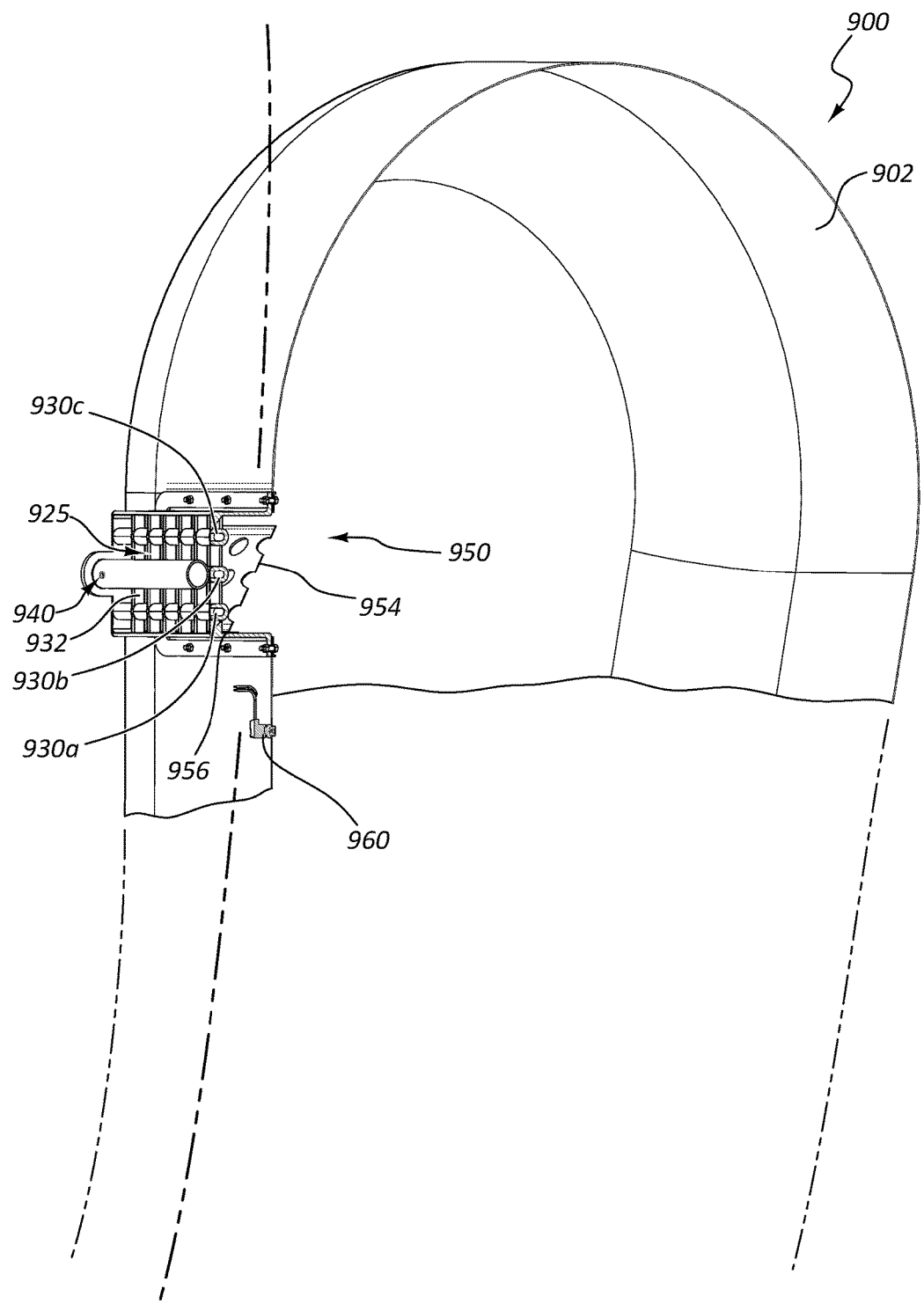
FIG. 10 is a partial, cross-sectional view of another embodiment of an airbag cushion assembly incorporating the airbag inflation module of FIG. 9.

FIG. 10 depicts another embodiment of an airbag cushion assembly 900 incorporating inflation module 910. As best shown in this figure, airbag cushion assembly 900 comprises an airbag cushion 902 and a one-way valve assembly 950 configured to automatically open airbag cushion 902 to introduction of ambient air through aspiration inlet 925 during inflation and then automatically close aspiration inlet 925 after sufficient inflation has taken place. As previously mentioned, this automatic opening may take place as a result of a vacuum or pressure differential caused by inflation gas being introduced at a high velocity through nozzles 935. Similarly, at a predetermined stage during inflation, this pressure differential may drop and/or be reversed to allow the valve 950 to close.

Valve assembly 950 preferably comprises a relatively rigid material (at least compared to the fabric of airbag cushion 902) and may be hinged at one end, as shown at 956, such that panel 954 is biased towards its closed position. Panel 954 may also comprise a plurality of openings, configured to allow for receipt of some or all of the nozzles 935. As previously mentioned, in some embodiments, another flap may overlap panel 954 or be otherwise coupled with panel 954. Similarly, as described below in greater detail in connection with the embodiment of FIGS. 12 and 13, some embodiments may comprise multiple panels, which in some such embodiments may overlap. However, as best shown in FIG. 10, in some embodiments, panel 954 may be used without another flap or another panel.

As also shown in FIG. 10, airbag cushion assembly 900 further comprises a second initiator/igniter 960 positioned to extend within airbag cushion 902. After introducing a sufficient volume of inflation gases and ambient air through aspiration, initiator 960 may be configured to ignite a flammable gas inside airbag cushion 902 comprising the gas mixture from chamber 944 and ambient air. The resulting combustion reaction may then complete the process of inflating airbag cushion 902. This process may allow for rapid inflation of relatively large airbag cushions (in some embodiments, cushions of 600 L or more). In some embodiments, the valve assembly 950 may be configured to be closed by the force from the ignition of the gases within airbag cushion 902 by initiator 960.

In some embodiments, initiator 960 may be configured to deploy at a particular, desired point during introduction of the gas mixture and ambient air. For example, in some preferred embodiments, initiator 960 may be configured to ignite the combined air and gas mixture following depletion/expulsion of all of the gases from chamber 944. Preferably, however, there is no delay, or at least substantially no delay, between such depletion/expulsion and the ignition. Thus, in some embodiments, the spark from initiator 960 may be delivered near the end of, rather than technically following, the process of introducing gases from chamber 944 into airbag cushion 902 along with ambient air. As shown in FIG. 10, initiator 960 may be spaced apart from inflator module 910. However, alternative embodiments are contemplated in which this initiator/igniter 960 may instead be incorporated into the inflator module 910. Either way, preferably initiator 960 is positioned to extend into airbag cushion 902 or otherwise make contact with the gas within airbag cushion 902.

Figure 11:
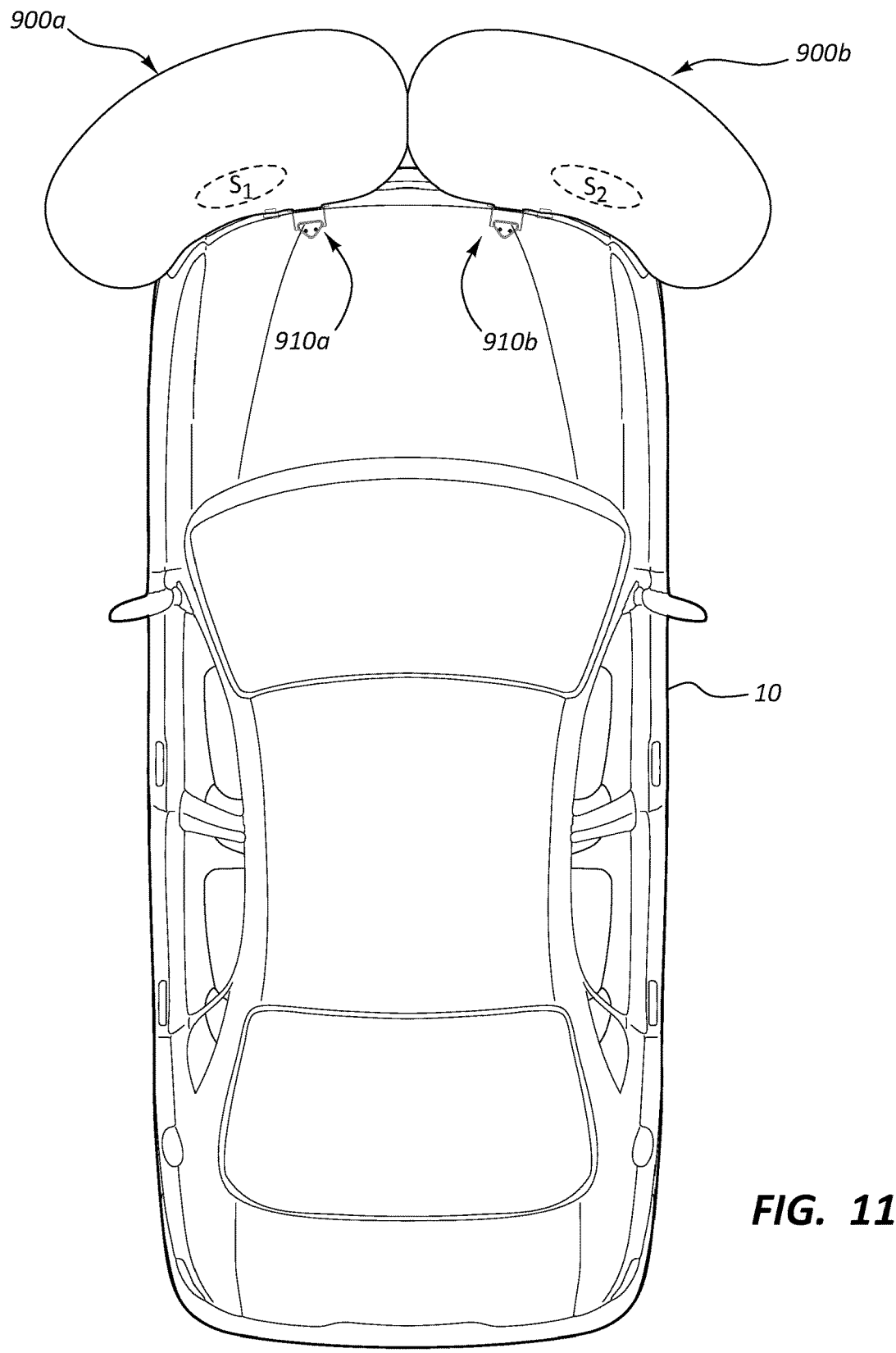
FIG. 11 is an upper plan view of a vehicle incorporating two airbag cushion assemblies as pedestrian airbags.

Because of the implications of deploying an airbag by way of ignition of a flammable gas in an occupant space, airbag cushion assembly 900 may be particularly useful for pedestrian airbags configured to be deployed from an exterior surface of a vehicle during an impact so as to cushion a pedestrian during the impact, or other airbags configured to deploy outside an enclosed occupant space. Thus, FIG. 11 depicts a vehicle 10 incorporating two external/pedestrian airbag cushion assemblies 900*a* and 900*b* configured to be inflated by aspirating airbag inflation modules 910*a* and 910*b*, respectively, which may comprise compressed gas chambers, as previously mentioned.

Vehicle 10 may further comprise one or more sensors, such as pre-crash sensors S1/S2. In some embodiments, a separate sensor may be used for each airbag cushion assembly, as shown in FIG. 11. Such sensors may be useful in allowing for inflation to take place in sufficient time before impact with a pedestrian in order to provide a sufficient cushion for impact. In some embodiments, sensors S1 and/or S2 may comprise pre-crash sensors incorporating, for example, cameras, radar, and/or lasers.

FIG. 10 depicts another embodiment of an airbag cushion assembly 900 incorporating inflation module 910. As best shown in this figure, airbag cushion assembly 900 comprises an airbag cushion 902 and a one-way valve assembly 950 configured to automatically open airbag cushion 902 to introduction of ambient air through aspiration inlet 925 during inflation and then automatically close aspiration inlet 925 after sufficient inflation has taken place. As previously mentioned, this automatic opening may take place as a result of a vacuum or pressure differential caused by inflation gas being introduced at a high velocity through nozzles 935. Similarly, at a predetermined stage during inflation, this pressure differential may drop and/or be reversed to allow the valve 950 to close.

Valve assembly 950 preferably comprises a relatively rigid material (at least compared to the fabric of airbag cushion 902) and may be hinged at one end, as shown at 956, such that panel 954 is biased towards its closed position. Panel 954 may also comprise a plurality of openings, configured to allow for receipt of some or all of the nozzles 935. As previously mentioned, in some embodiments, another flap may overlap panel 954 or be otherwise coupled with panel 954. Similarly, as described below in greater detail in connection with the embodiment of FIGS. 12 and 13, some embodiments may comprise multiple panels, which in some such embodiments may overlap. However, as best shown in FIG. 10, in some embodiments, panel 954 may be used without another flap or another panel.

As also shown in FIG. 10, airbag cushion assembly 900 further comprises a second initiator/igniter 960 positioned to extend within airbag cushion 902. After introducing a sufficient volume of inflation gases and ambient air through aspiration, initiator 960 may be configured to ignite a flammable gas inside airbag cushion 902 comprising the gas mixture from chamber 944 and ambient air. The resulting explosion/reaction may then complete the process of inflating airbag cushion 902. This process may allow for rapid inflation of relatively large airbag cushions (in some embodiments, cushions of 600 L or more). In some embodiments, the valve assembly 950 may be configured to be closed by the force from the ignition of the gases within airbag cushion 902 by initiator 960.

In some embodiments, initiator 960 may be configured to deploy at a particular, desired point during introduction of the gas mixture and ambient air. For example, in some preferred embodiments, initiator 960 may be configured to ignite the combined air and gas mixture following depletion/expulsion of all of the gases from chamber 944. Preferably, however, there is no delay, or at least substantially no delay, between such depletion/expulsion and the ignition. Thus, in some embodiments, the spark from initiator 960 may be delivered near the end of, rather than technically following, the process of introducing gases from chamber 944 into airbag cushion 902 along with ambient air. As shown in FIG. 10, initiator 960 may be spaced apart from inflator module 910. However, alternative embodiments are contemplated in which this initiator/igniter 960 may instead be incorporated into the inflator module 910.

Figure 12:
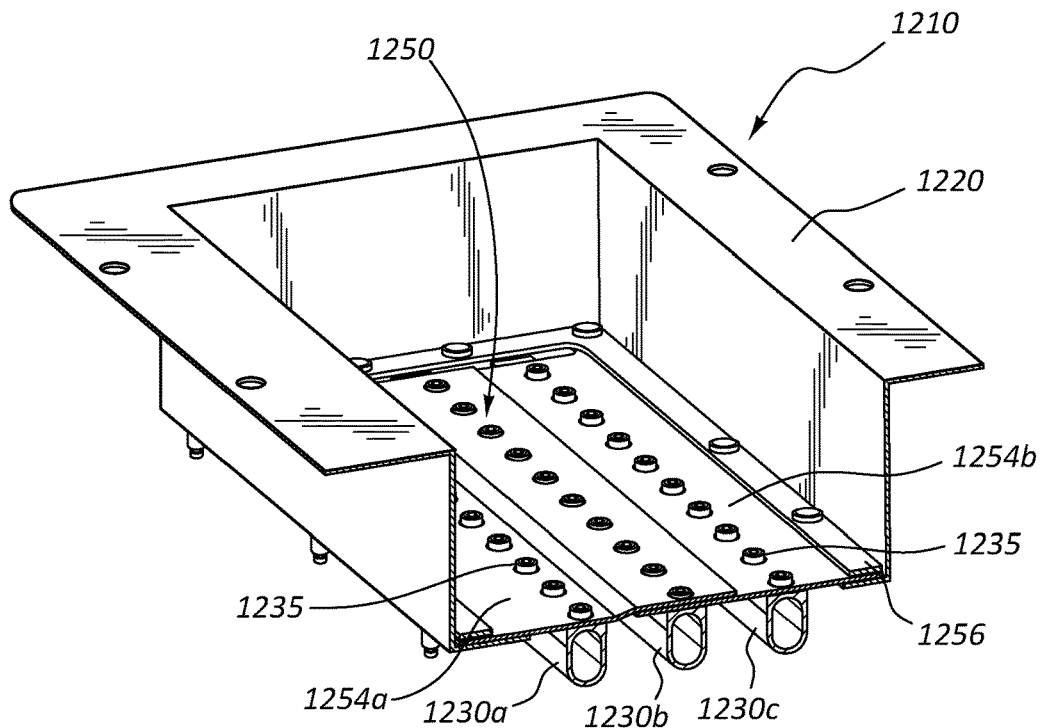
FIG. 12 is a cross-sectional view of an airbag inflation module according to still another embodiment, the airbag inflation module depicted in a closed position.
Figure 13:
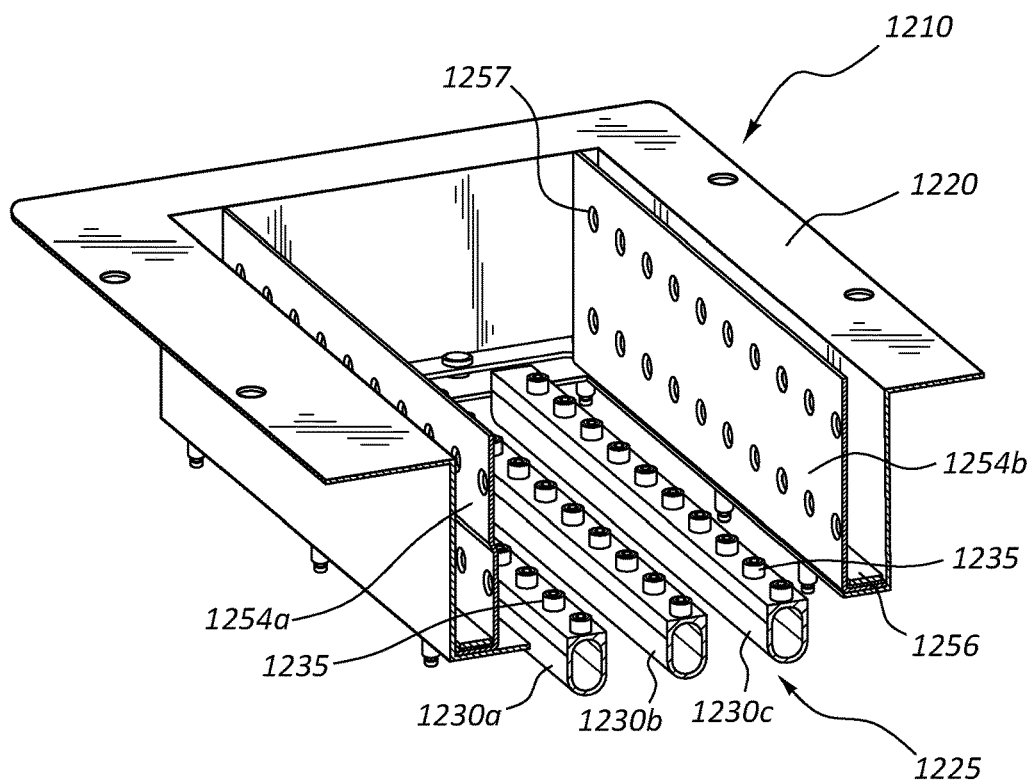
FIG. 13 is a cross-sectional view of the airbag inflation module of FIG. 12 shown in an open position.

FIGS. 12 and 13 depict yet another embodiment of an airbag inflation module 1210 that may be used in connection with one or more of the airbag cushion assemblies disclosed herein. Airbag inflation module 1210 comprises a valve assembly 1250. FIG. 12 depicts airbag inflation module 1210 with valve assembly 1250 in a closed position in which aspiration inlet 1225 is blocked. As described above, in preferred embodiments, valve assembly 1250 is in this closed position until deployment of an inflator (not shown), after which valve assembly 1250 may be repositioned to an open position, as depicted in FIG. 13. Preferably, valve assembly 1250 is configured to automatically open during deployment of the inflator to allow for introduction of ambient air through aspiration inlet 1225 and then automatically close aspiration inlet 1225 after sufficient inflation has taken place. As previously mentioned, this automatic opening may take place as a result of a vacuum or pressure differential caused by inflation gas being introduced at a high velocity through nozzles 1235. Similarly, at a predetermined stage during inflation, this pressure differential may drop and/or be reversed to allow the valve assembly 1250 to close.

Valve assembly 1250 comprises two panels, namely, panel 1254*a* and panel 1254*b*, which extend towards one another in the closed position of FIG. 12. As also depicted in this figure, panels 1254*a* and 1254*b* overlap with one another in the closed position. However, alternative embodiments are contemplated in which panels 1254*a* and 1254*b* do not overlap. Panels 1254*a* and 1254*b* may instead, for example, extend towards one another such that their respective ends touch, or nearly touch.

As previously mentioned, preferably one or both of panels 1254*a* and 1254*b* are biased towards their respective closed positions. In the depicted embodiment, panels 1254*a* and 1254*b* are biased towards their respective closed positions by way of a coupling member 1256 that is configured to couple one or both of first panel 1254*a* and second panel 1254*b* to a housing 1220 of inflation module 1210 at a first end of the panels 1254*a* and/or 1254*b*. Although in the depicted embodiment, coupling member 1256 extends about an entire inner perimeter of housing 1220, in other embodiments two separate coupling members may be used, such as one for each panel. Also, in the depicted embodiment, coupling member 1256 comprises a coupling band 1256 extending along a perimeter of panels 1254*a* and/or 1254*b* at respective first ends of panels 1254*a* and/or 1254*b* adjacent to housing 1220. Coupling band 1256 is further configured to sandwich the perimeter of panels 1254*a* and/or 1254*b* between housing and 1220 the coupling band 1256. As best seen in FIG. 12, various fasteners, such as rivets, bolts, and the like, may be used to sandwich the perimeter of panels 1254*a* and/or 1254*b* between housing and 1220 the coupling band 1256.

By restricting the ability of panels 1254*a* and/or 1254*b* to flex at one end, the coupling band 1256 may be configured to allow panels 1254*a* and/or 1254*b* to pivot between the open position and the closed position. Thus, preferably, panels 1254*a* and/or 1254*b* comprise a flexible yet resilient material, such as a thermoplastic material, such that force at least in part from inflation gas being delivered through nozzles 1235, along with entrained ambient air through aspiration inlet 1225, causes panels 1254a and/or 1254b to pivot to their respective open positions and, following sufficient inflation, return to their respective closed positions.

However, in alternative embodiments, one or more hinges may be provided for use in biasing one or both of panels 1254a and 1254b towards their respective closed positions. Hinges, such as hinges 156, 656, or 956 are examples of means for biasing a vent panel towards a closed position. Coupling band 1256 is another example of means for biasing a vent panel towards a closed position.

Airbag inflation module 1210 further comprises a plurality of inflator conduits 1230a, 1230b, and 1230c, each of which comprises a plurality of high-velocity nozzles 1235 extending therefrom. As previously mention, in some preferred embodiments, one or more of inflator conduits 1230a, 1230b, and 1230c may have a cross-sectional dimension that decreases in size as the inflator conduit 1230 extends away from the inflator (not shown). Similarly, in preferred embodiments, inflator conduits 1230a, 1230b, and/or 1230c, nozzles 1235, housing 1220, and/or the entire inflation module 1210, may be made from a molded thermoplastic material.

As best shown in FIG. 13, one or both of panels 1254a and 1254b may also comprise a plurality of openings 1257, which may be configured to allow for receipt of some or all of the nozzles 1235 therethrough. As shown in FIG. 12, in embodiments comprising a valve assembly 1250 having overlapping vent panels 1254a and 1254b, a region (shown extending along the central inflator conduit 1230b) may be configured such that its nozzles 1235 extend through a first set of openings in one panel 1254b, and a second set of openings in the opposite panel 1254a, in the closed position.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
    an airbag cushion;
    an inflation module, comprising:
        an inflator;
        a plurality of high-velocity nozzles fluidly coupled with the inflator, wherein the plurality of high-velocity nozzles is configured to deliver inflation gas from the inflator into the airbag cushion;
        an inflator conduit, wherein the inflator conduit is fluidly coupled with the inflator and fluidly coupled with the plurality of high-velocity nozzles; and
        a housing coupled to the airbag cushion, wherein the housing comprises an aspiration inlet configured to allow for receipt of ambient air into the airbag cushion during inflation of the airbag cushion, and wherein the plurality of high-velocity nozzles is configured to, upon actuation of the inflator, draw ambient air into the airbag cushion along with the inflation gas from the inflator; and
    a valve configured to open upon actuation of the inflator, wherein the valve is configured to close during inflation of the airbag cushion to prevent air and inflation gas from exiting through the aspiration inlet.

2. The airbag cushion assembly of claim 1, wherein the valve is configured to automatically close at a predetermined stage during inflation of the airbag cushion.

3. The airbag cushion assembly of claim 2, wherein the valve is biased towards a closed position.

4. The airbag cushion assembly of claim 1, wherein the inflator conduit comprises a cross-sectional dimension that decreases in size as the inflator conduit extends away from a portion of the inflator through which inflation gas is delivered.

5. The airbag cushion assembly of claim 1, further comprising a second inflator conduit fluidly coupled with the inflator, wherein the second inflator conduit comprises a second plurality of high-velocity nozzles configured to deliver inflation gas from the inflator into the airbag cushion.

6. An airbag cushion assembly, comprising:
    an airbag cushion;
    an inflation module, comprising:
        an inflator;
        a housing coupled to the airbag cushion, wherein the housing comprises an aspiration inlet configured to allow for receipt of ambient air into the airbag cushion during inflation of the airbag cushion;
        an inflator conduit coupled with the housing and fluidly coupled with the inflator; and
        a plurality of high-velocity nozzles fluidly coupled with the inflator conduit, wherein each of the plurality of high-velocity nozzles is configured to deliver inflation gas from the inflator into the airbag cushion, and wherein each of the plurality of high-velocity nozzles is configured to, upon actuation of the inflator, draw ambient air into the airbag cushion along with the inflation gas from the inflator; and
    a valve comprising:
        a flap comprising a plurality of openings; wherein each of the plurality of high-velocity nozzles extends through a corresponding opening of the plurality of openings formed in the flap; and
        a support member coupled to the flap, wherein the support member is biased towards a closed position in which the flap blocks the aspiration inlet, wherein the flap is configured to open upon actuation of the inflator, and wherein the valve is configured to close during inflation of the airbag cushion to prevent air and inflation gas from exiting through the aspiration inlet following inflation of the airbag cushion.

7. The airbag cushion assembly of claim 6, wherein the valve further comprises a hinge configured to bias the support member towards the closed position.

8. The airbag cushion assembly of claim 6, wherein the flap is formed from a portion of the airbag cushion.

9. The airbag cushion assembly of claim 6, wherein the inflator conduit comprises a cross-sectional dimension that decreases in size as the inflator conduit extends away from a portion of the inflator through which inflation gas is delivered.

10. An airbag cushion assembly, comprising:
    an airbag cushion;
    an inflation module, comprising:
        a compressed gas chamber fluidly coupled with the airbag cushion, wherein the compressed gas chamber comprises a gas mixture comprising a flammable gas and an inert gas; and
        a housing coupled to the airbag cushion, wherein the housing comprises an aspiration inlet configured to allow for receipt of ambient air into the airbag cushion during inflation of the airbag cushion, and wherein, upon actuation, the compressed gas chamber is configured to force the gas mixture into the airbag cushion, and wherein the gas mixture is configured to draw ambient air into the airbag cushion while being forced into the airbag cushion; and
    an initiator extending into the airbag cushion, wherein the initiator is configured to ignite a flammable gas inside the airbag cushion upon actuation, and wherein the flammable gas comprises the gas mixture and ambient air.

11. The airbag cushion assembly of claim 10, wherein the inflation module further comprises at least one nozzle fluidly coupled with the compressed gas chamber, wherein the at least one nozzle is configured to deliver the gas mixture from the compressed gas chamber into the airbag cushion.

12. The airbag cushion assembly of claim 11, wherein the at least one nozzle comprises a plurality of high-velocity nozzles, wherein the plurality of high-velocity nozzles are configured to draw ambient air into the airbag cushion along with the gas mixture from the compressed gas chamber.

13. The airbag cushion assembly of claim 10, wherein the airbag cushion comprises a pedestrian airbag cushion configured to be deployed from an exterior surface of a vehicle during an impact so as to cushion a pedestrian during the impact.

14. The airbag cushion assembly of claim 10, wherein the compressed gas chamber lacks an oxidizing gas, and wherein the airbag cushion assembly is configured such that oxygen obtained from the ambient air is used as an oxidizing gas during ignition of the flammable gas.

15. The airbag cushion assembly of claim 14, wherein the flammable gas comprises at least one of hydrogen and methane, and wherein the inert gas comprises at least one of nitrogen and argon.

16. The airbag cushion assembly of claim 15, wherein the gas mixture comprises hydrogen in an amount between about 30 mol % and about 40 mol %, and wherein the gas mixture further comprises argon in an amount between about 60 mol % and about 70 mol %.

17. The airbag cushion assembly of claim 10, further comprising a second initiator coupled with the compressed gas chamber, wherein the second initiator is configured to, upon actuation, force the gas mixture into the airbag cushion with sufficient force to draw ambient air into the airbag cushion with the gas mixture.

18. The airbag cushion assembly of claim 10, further comprising a valve configured to open upon actuation of the inflator, wherein the valve is configured to close during inflation of the airbag cushion.

19. An airbag inflation module, comprising:
    a housing configured to be coupled with an airbag cushion, wherein the housing comprises an aspiration inlet configured to allow for receipt of ambient air into the airbag cushion during inflation of the airbag cushion;
    an inflator configured to generate an inflation gas to facilitate inflation of the airbag cushion;
    an inflator conduit coupled with the housing and fluidly coupled with the inflator;
    a valve assembly comprising:
        a first panel; and
        a second panel, wherein the valve assembly is configured to be positioned in an open position in which ambient air is allowed to pass through the aspiration inlet and a closed position in which the first panel and the second panel block the aspiration inlet; and
    a plurality of high-velocity nozzles fluidly coupled with the inflator conduit, wherein each of the plurality of high-velocity nozzles is configured to deliver inflation gas from the inflator, and wherein each of the plurality of high-velocity nozzles is configured to, upon actuation of the inflator, draw ambient air though the aspiration inlet along with the inflation gas from the inflator.

20. The airbag inflation module of claim 19, wherein the first panel is configured to at least partially overlap with the second panel in the closed position.

21. The airbag inflation module of claim 20, wherein the first panel comprises a lower panel, wherein the second panel comprises an upper panel, wherein the lower panel is configured to be positioned below the upper panel in the closed position, and wherein the valve assembly is configured such that, following actuation of the inflator, the valve assembly is configured to return to the closed position with the lower panel positioned below the upper panel.

22. The airbag inflation module of claim 21, wherein the lower panel is biased towards a closed position in which the lower panel at least partially blocks the aspiration inlet, wherein the upper panel is biased towards a closed position in which the upper panel at least partially blocks the aspiration inlet, and wherein the lower panel is biased towards the closed position with a greater force than a force with which the upper panel is biased towards the closed position.

23. The airbag inflation module of claim 19, wherein the first panel comprises a plurality of openings configured to receive at least a subset of the plurality of high-velocity nozzles therethrough.

24. The airbag inflation module of claim 23, wherein the second panel comprises a plurality of openings configured to receive at least a subset of the plurality of high velocity nozzles therethrough.

25. The airbag inflation module of claim 24, wherein at least some of the plurality of openings of the first panel overlap with at least some of the plurality of openings of the second panel such that at least some of the plurality of high velocity nozzles are configured to extend through an opening of the first panel and an opening of the second panel in the closed position.

26. The airbag inflation module of claim 19, wherein the valve assembly further comprises means for biasing at least one of the first panel and the second panel towards the closed position.

27. The airbag inflation module of claim 26, wherein the means for biasing comprises:
   a first hinge configured to bias the first panel towards the closed position; and
   a second hinge configured to bias the second panel towards the closed position.

28. The airbag inflation module of claim 26, wherein the means for biasing comprises a coupling member configured to couple at least one of the first panel and the second panel to the housing at a first end of the at least one of the first panel and the second panel, wherein the coupling member is configured to allow the at least one of the first panel and the second panel to pivot between the open position and the closed position.

29. The airbag inflation module of claim 28, wherein the coupling member comprises a coupling band extending along a perimeter of the at least one of the first panel and the second panel at the first end, and wherein the coupling band is configured to sandwich the perimeter of the at least one of the first panel and the second panel between the housing and the coupling band.

\* \* \* \* \*